United States Patent [19]
Bores

[11] 3,858,924
[45] Jan. 7, 1975

[54] TRUCK BUMPER GUIDE

[76] Inventor: John F. Bores, 27 Baker St., Monroeville, Ohio 44847

[22] Filed: July 17, 1973

[21] Appl. No.: 380,085

[52] U.S. Cl..................... 293/69, 116/28 R, 248/43
[51] Int. Cl............................................ B60r 19/00
[58] Field of Search........ 293/64, 69, 1, 62; 248/43, 248/226 D, 214; 240/8.1 R; 116/28 R, 28 A; 280/150 R, 150 P; 180/1 A, 1 AP

[56] References Cited
UNITED STATES PATENTS
| | | | |
|---|---|---|---|
| 595,218 | 12/1897 | Stauffer | 248/43 |
| 1,811,494 | 6/1931 | Conway | 248/43 X |
| 2,121,317 | 6/1938 | Cohen | 116/28 R |
| 2,143,997 | 1/1939 | Parkinson | 280/150 R |
| 2,238,306 | 4/1941 | Braswell | 116/28 A |

Primary Examiner—Lloyd L. King
Assistant Examiner—John J. Love
Attorney, Agent, or Firm—Diller, Brown, Ramik & Wight

[57] ABSTRACT

This disclosure relates to a bumper guide which is particularly adapted to be mounted on the ends of front bumpers of trucks for the purpose of permitting a truck operator to be fully aware of the exact positions of the ends of the bumper and the associated fenders.

4 Claims, 3 Drawing Figures

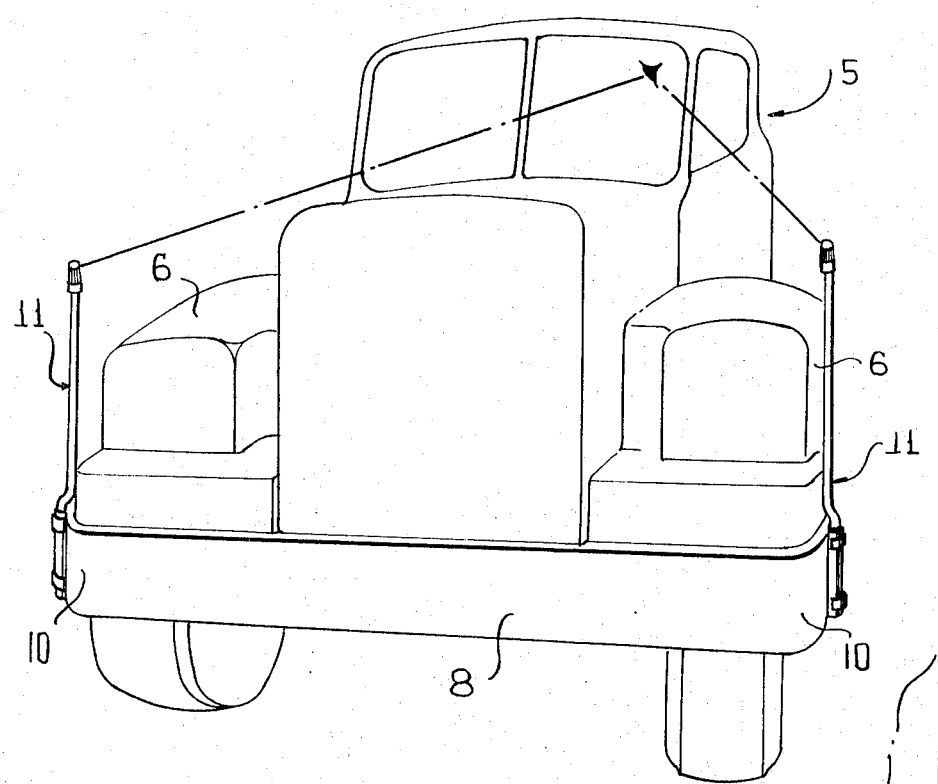
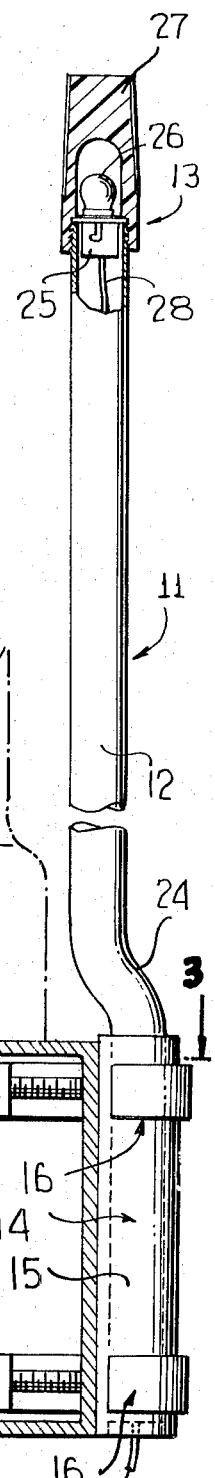
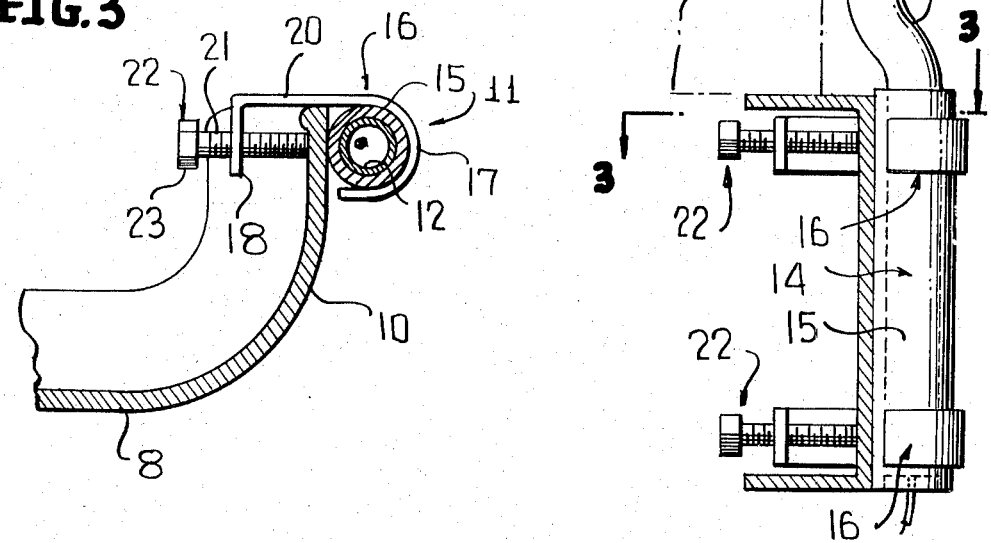

TRUCK BUMPER GUIDE

This invention relates in general to new and useful improvements in vehicle attachments, and more particularly relates to a novel guide which is attachable to ends of truck bumpers for visually indicating the exact positions of the bumpers and associated fenders.

BACKGROUND OF THE INVENTION

Although modern day vehicles have been designed from the standpoint of permitting the driver to have maximum visability including the location of the front fenders thereof, in certain vehicles, particularly large trucks, the bumpers and forward portions of the fenders are not fully visible. As a result, it is not possible for an operator of such a truck to fully appreciate the exact position of the projecting ends of the front bumper and the forward portions of the fenders.

In the past there have been developed suitable guides which were mounted directly on fenders for the purpose of indicating the position of the fenders. Such guides, however, do not have mounting means which will facilitate the mounting thereof on truck bumpers.

Further, it is to be fully appreciated that from time to time the operator of a truck may scrape the ends of the truck bumper against relatively immovable objects with the result that there would be a tendency to knock off any bumper guide applied thereto. It is, therefore, necessary that the bumper guide be of a rigid construction which is not readily damaged in the event of such accidental striking or a relatively immovable foreign object.

SUMMARY OF THE INVENTION

In accordance with this invention, there has been developed a guide which is particularly adapted to be mounted on a bumper of a vehicle which has ends which project outwardly beyond the fender and other adjacent body components of the vehicle. The guide is provided with its own mounting means for effecting the securement thereof directly to a truck bumper without requiring any special tools.

One of the primary features of the guide is that it includes an upstanding standard, which standard is offset immediately above the bumper so that although the standard is mounted exteriorly of the bumper, the primary portion of the standard lies in a plane in alignment with the bumper end. In this manner, the guide accurately indicates the exact position of the bumper end.

Another feature of the invention is that the mounting means for the guide include simple adjustable clamp members in the form of bolts threadedly carried by brackets, which bolts are engageable with the inner surface of the associated end of a bumper and may be tightly drawn so as to retain the standard in place on the bumper.

A further feature of the bumper guide is the formation of the mounting means in the form of a sleeve which receives and reinforces the lower end of the guide standard, and the sleeve is provided with a pair of mounting members, each of the mounting members including a hook portion permanently secured to the sleeve and a flange receiving adjustable clamping means for tightly drawing the sleeve against the exterior surface of the bumper end and retaining the sleeve in place while providing for a rigid structure which will resist light loadings thereon which would have a tendency to crush the guide standard and release the same from the bumper.

With the above and other objects in view that will hereinafter appear, the nature of the invention will be more clearly understood by reference to the following detailed description, the appended claims and the several views illustrated in the accompanying drawings:

IN THE DRAWINGS:

FIG. 1 is a front perspective view of a truck having mounted on the ends of the front bumper thereof guides in accordance with this invention.

FIG. 2 is an enlarged fragmentary vertical sectional view taken along the line 2—2 of FIG. 1 and shows the specific details of the guide and the mounting thereof on a bumper end.

FIG. 3 is an enlarged fragmentary horizontal sectional view taken along the line 3—3 of FIG. 2 and shows specifically the relationship of the mounting means of the guide with respect to the bumper end.

Referring now to the drawings in detail, it will be seen that there is illustrated in FIG. 1 a conventional truck of the heavy duty type, the truck being generally identified by the numeral 5. The truck 5 is provided with the customary front fenders 6 and a customary front bumper 8. The front bumper 8 has rearwardly turned ends 10 which project outwardly beyond the fenders.

Due to the bulk of the truck 5, although it may be of a modern design so that the operator thereof has good front visibility, it is still impossible for the operator to know the exact position of the outwardly projecting bumper ends 10. In order that the truck operator may readily ascertain the exact positions of the bumper ends 10, in accordance with this invention, there is provided a guide 11, there being one guide 11 mounted on each of the bumper ends 10.

As is best illustrated in FIGS. 2 and 3, the guide 11 includes a standard 12 which is provided at the upper end thereof with sighting means 13 and at the lower end thereof with mounting means 14.

The mounting means 14 include a sleeve 15 into which is fixedly received the lower end portion of the standard 12 and which serves as a reinforcement for the standard 12. The sleeve 15 carries in vertically spaced relation a pair of mounting members, each identified by the numeral 16. The mounting members 16 serve to tightly clamp the sleeve 15 against the outer surface of the associated bumper end 10.

Referring now to FIG. 3, it will be seen that each mounting member 16 is in the form of an elongated strap-like member which terminates at one end thereof in a hook portion 17 and at the opposite end thereof in an offset flange 18. The hook portion 16 is looped about and is preferably fixedly secured to the sleeve 15 by means of welding, such as spot welding. The hook portion 17 is connected to the flange 18 by an elongated intermediate portion 20 of a length wherein the flange 18 may be disposed in spaced relation from the bumper end 10 while the sleeve 15 is in abutment therewith. The flange is provided with an internally threaded bore aligned with the center of the sleeve 15 and having threadedly engaged therein a threaded shank 21 of a clamping member 22. The clamping member 22 may be in the form of a simple bolt having a head 23 which facilitates the tightening thereof against the inner surface of the bumper end 10 whereby when the two clamping members 22 are tightly clamped against the bumper end 10, the sleeve 15 will be fixedly secured in place.

Inasmuch as the lower end of the standard 12, of necessity, is disposed outwardly of the bumper end 10 and does not correspond with the plane of the bumper end 10, the standard 12 is inwardly offset as at 24 slightly above the sleeve 15. The net result is that the main portion of the standard 12 is in vertical alignment with the bumper end 10 to which it is secured. Thus, the upper portion of the standard 12 accurately represents an upward extension of the bumper end 10 and thus the position of the bumper end 10 may be readily ascertained by the truck operator.

The sighting device 13 is beneficially illuminated and accordingly, the upper end of the standard 12 is provided with a lamp socket 25 which has releaseably mounted therein a lamp or bulb 26. A transparent cover 27 is secured to the upper end of the standard 12, preferably by threaded engagement, and protects the bulb 26. The plastic cover 27 may be of any color, but is preferably is amber.

A wire 28 is connected to the socket 25 and extends down through the standard 12 and out through the bottom thereof for connection to the electrical system of the truck.

It will be readily apparent from the foregoing description that the upper end of the standard 12 accurately represents to the truck operator the position of the associated end 10 of the bumper 8 of the truck so that the truck operator is fully aware at all times of the exact positions of the ends of the front bumper. At the same time, the mounting portion of the guide is of sufficient rigidity so as to prevent damage thereof in the event the truck operator should scrape a relatively immovable object therewith.

While the guide has been illustrated as being mounted on a bumper having rearwardly turned ends, it will be apparent that the guide may equally as well be mounted on a straight bumper.

Although only a preferred embodiment of the invention has been specifically illustrated and described herein, it is to be understood that minor variations may be made in the guide construction without departing from the spirit and scope of the invention, as defined by the appended claims.

I claim:

1. A bumper guide particularly adapted for use with trucks and like vehicles having a bumper with a free end, said bumper guide comprising an upstanding standard, and mounting means along a lower portion of said standard for clamping said standard lower portion to an exterior surface of a bumper free end, said mounting means including adjustable clamp means positioned remotely from said standard for concealment and protection by a bumper end, said mounting means including a pair of vertically spaced mounting members each having at one end a hook portion and at the opposite end a flange, said flanges carrying said clamp means, each flange having an internally threaded bore, and said clamp means being in the form of an externally threaded clamp member adjustably carried by the respective flange.

2. A bumper guide particularly adapted for use with trucks and like vehicles having a bumper with a free end, said bumper guide comprising an upstanding standard, and mounting means along a lower portion of said standard for clamping said standard lower portion to an exterior surface of a bumper free end, said mounting means including adjustable clamp means position remotely from said standard for concealment and protection by a bumper end, said mounting means including a pair of vertically spaced mounting members each having at one end a hook portion and at the opposite end a flange, said flanges carrying said clamp means, a reinforcing sleeve telescoped over said standard lower end, and said hook portions being fixedly secured to said sleeve.

3. The bumper guide of claim 2 wherein each flange has an internally threaded bore and said clamp means is in the form of an externally threaded clamp member adjustably carried by the respective flange.

4. The bumper guide of claim 2 wherein a light assembly is carried by the upper end of said standard.

* * * * *